US012742431B1

(12) United States Patent
He et al.

(10) Patent No.: US 12,742,431 B1
(45) Date of Patent: Sep. 22, 2026

(54) VENTED METHANE GAS MITIGATION SYSTEM WITH FAILURE DETECTION

(71) Applicant: Caterpillar Inc., Peoria, IL (US)

(72) Inventors: Yuesheng He, Sugar Land, TX (US); Todd Ryan Kabrich, Tomball, TX (US); Prabhu Jayaraman, Tomball, TX (US); Abdullrahman Ali, Cypress, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 19/187,343

(22) Filed: Apr. 23, 2025

(51) Int. Cl.
*F02D 41/00* (2006.01)

(52) U.S. Cl.
CPC .. *F02D 41/0027* (2013.01); *F02D 2200/0602* (2013.01)

(58) Field of Classification Search
CPC ......... F02D 41/0027; F02D 2200/0602; F02D 2200/0606; F02D 19/025; F02D 19/027
See application file for complete search history.

(56) References Cited

U.S. PATENT DOCUMENTS 8,382,469 B2 * 2/2013 Malm ..................... F02B 43/10 431/115
9,046,062 B2 6/2015 Tice
11,067,046 B2 7/2021 Fältén et al.
11,585,334 B2 2/2023 Swan
11,808,409 B2 11/2023 Robbins et al.
12,146,499 B2 11/2024 Tanaka et al.
12,158,159 B2 12/2024 Cipriani et al.
2008/0127950 A1 * 6/2008 Malm .................. F02M 25/089 123/527
2011/0094593 A1 * 4/2011 Malm .................. F02D 19/081 123/434
2013/0055712 A1 * 3/2013 Shimizu ................ F02D 19/027 60/605.1
2024/0133522 A1 4/2024 Gatlin et al.

FOREIGN PATENT DOCUMENTS

CA 2428889 A1 11/2004
CA 2838150 A1 * 7/2014 ............... F23N 5/18
CA 3060912 A1 * 5/2020 ........... F02D 41/182
CA 3069063 A1 * 7/2021 ........... F02M 21/023
JP 6077293 B2 2/2017
WO WO-2018122444 A1 * 7/2018 ......... F02M 21/0224

* cited by examiner

*Primary Examiner* — Hung Q Nguyen

(57) ABSTRACT

A methane gas mitigation system includes an engine comprising a fuel intake configured to receive a gas fuel source and produce mechanical power based on the gas fuel source; a primary gas compressor mechanically driven by the engine and configured to compress a majority portion of field gas into compressed field gas, and vent a minority portion of the field gas as a vented field gas; a vented flow path configured to carry the vented field gas from the primary gas compressor; a secondary gas compressor arranged on the vented flow path and configured to compress the vented field gas to satisfy a gas pressure operating range of the engine; and an engine fuel rail coupled to an output of the secondary gas compressor and configured to provide the vented field gas, within the gas pressure operating range, to the fuel intake of the engine.

20 Claims, 5 Drawing Sheets

VENTED METHANE GAS MITIGATION SYSTEM WITH FAILURE DETECTION

TECHNICAL FIELD

The present disclosure relates generally to a vented methane gas mitigation system.

BACKGROUND

A field gas, such as natural gas, may be collected at a field site and compressed by a compressor into a compressed field gas (e.g., compressed natural gas (CNG)) for storage and subsequent usage. For example, CNG is a fuel gas mainly composed of methane ($CH_4$), compressed to less than 1% of the volume it occupies at standard atmospheric pressure. CNG is typically stored and distributed in hard containers. CNG may be used as a fuel alternative to gasoline or diesel, particularly in vehicles, offering a cleaner-burning and potentially more economical option. During compression, some of the field gas may leak from the compressor into the atmosphere. For example, the compressor may include a compressor vent that vents a small portion of the field gas into the atmosphere. M ethane is a potent greenhouse gas. Thus, methane gas mitigation is needed to reduce an amount of methane gas that is released into the atmosphere.

In addition, viability and economics of greenhouse gas mitigation technologies are significantly impacted by energy consumption of a methane gas mitigation process. In other words, an amount of energy required to effectively reduce and/or capture methane gas from a gas stream should be minimized. Thus, more effective methods for capturing (or recycling) methane gas with reduced energy consumption are needed.

The methane gas mitigation system of the present disclosure solves one or more of the problems set forth above and/or other problems in the field.

SUMMARY

A methane gas mitigation system may include an engine comprising a fuel intake configured to receive a gas fuel source and produce mechanical power based on the gas fuel source, wherein the engine is configured to operate according to the gas fuel source being within a gas pressure operating range; a primary gas compressor mechanically driven by the engine, wherein the primary gas compressor is configured to compress a majority portion of field gas into compressed field gas, and wherein the primary gas compressor is configured to vent a minority portion of the field gas as a vented field gas; a vented flow path configured to carry the vented field gas from the primary gas compressor; a secondary gas compressor arranged on the vented flow path and configured to compress the vented field gas to satisfy the gas pressure operating range; an atmospheric vent path configured to release gas to an atmosphere; a three-way electrically-controlled valve arranged on the vented flow path between the primary gas compressor and the secondary gas compressor, the three-way electrically-controlled valve being coupled to the atmospheric vent path and configured to, based on an electronic control of the three-way electrically-controlled valve, enable the vented field gas to flow to the secondary gas compressor or redirect the vented field gas to the atmospheric vent path; an engine fuel rail coupled to an output of the secondary gas compressor and configured to provide the vented field gas, within the gas pressure operating range, to the fuel intake of the engine, the vented field gas being provided to the fuel intake as a portion of the gas fuel source; one or more sensors arranged on the vented flow path downstream from the three-way electrically-controlled valve, each sensor of the one or more sensors configured to measure a respective property of the vented field gas and generate a sensor signal based on the respective property such that one or more sensor signals are generated; and a controller configured to receive the one or more sensor signals, and control the secondary gas compressor and the three-way electrically-controlled valve based on the one or more sensor signals.

A methane gas mitigation system may include an engine comprising a fuel intake configured to receive a gas fuel source and produce mechanical power based on the gas fuel source, wherein the engine is configured to operate according to the gas fuel source being within a gas pressure operating range; a primary gas compressor mechanically driven by the engine, wherein the primary gas compressor is configured to compress a majority portion of field gas into compressed field gas, and wherein the primary gas compressor is configured to vent a minority portion of the field gas as a vented field gas; a vented flow path configured to carry the vented field gas from the primary gas compressor; a secondary gas compressor arranged on the vented flow path and configured to compress the vented field gas to satisfy the gas pressure operating range; an atmospheric vent path configured to release gas to an atmosphere; a three-way hand valve arranged on the vented flow path between the primary gas compressor and the secondary gas compressor, the three-way hand valve being coupled to the atmospheric vent path, wherein the three-way hand valve is configurable in an open state for enabling the vented field gas to flow to the secondary gas compressor, and is configurable in a closed state for redirecting the vented field gas to the atmospheric vent path; an engine fuel rail coupled to an output of the secondary gas compressor and configured to provide the vented field gas, within the gas pressure operating range, to the fuel intake of the engine, the vented field gas being provided to the fuel intake as a portion of the gas fuel source; one or more sensors arranged on the vented flow path downstream from the three-way hand valve, each sensor of the one or more sensors configured to measure a respective property of the vented field gas and generate a sensor signal based on the respective property such that one or more sensor signals are generated; and a controller configured to receive one or more sensor signals and control the secondary gas compressor based on the one or more sensor signals.

A method of mitigating methane from being released into an atmosphere may include providing a gas fuel source to a fuel intake of an engine, the gas fuel source being provided within a gas pressure operating range of the engine; producing, by the engine, mechanical power based on fuel source; using the mechanical power to drive a primary gas compressor, the primary gas compressor being configured to compress a majority portion of field gas into compressed field gas, and vent a minority portion of the field gas as a vented field gas to a vented flow path; compressing, by a secondary gas compressor arranged on the vented flow path, the vented field gas to satisfy the gas pressure operating range; providing, by an engine fuel rail coupled to an output of the secondary gas compressor, the vented field gas to the fuel intake of the engine, the vented field gas being provided to the fuel intake as a portion of the gas fuel source; sensing, by a sensor arranged on the vented flow path, a property of the vented field gas to generate a sensor signal that is representative of the property; controlling, by a controller, a three-way electrically-controlled valve based on the sensor signal, the three-way electrically-controlled valve being arranged on the vented flow path between the primary gas compressor and the secondary gas compressor, the three-way electrically-controlled valve being coupled to an atmospheric vent path, and the three-way electrically-controlled valve being configurable in an open state for enabling the vented field gas to flow to the secondary gas compressor, and is configurable in a closed state for redirecting the vented field gas to the atmospheric vent path; and controlling, by the controller, the secondary gas compressor based on the sensor signal.

DETAILED DESCRIPTION

Figure 1:
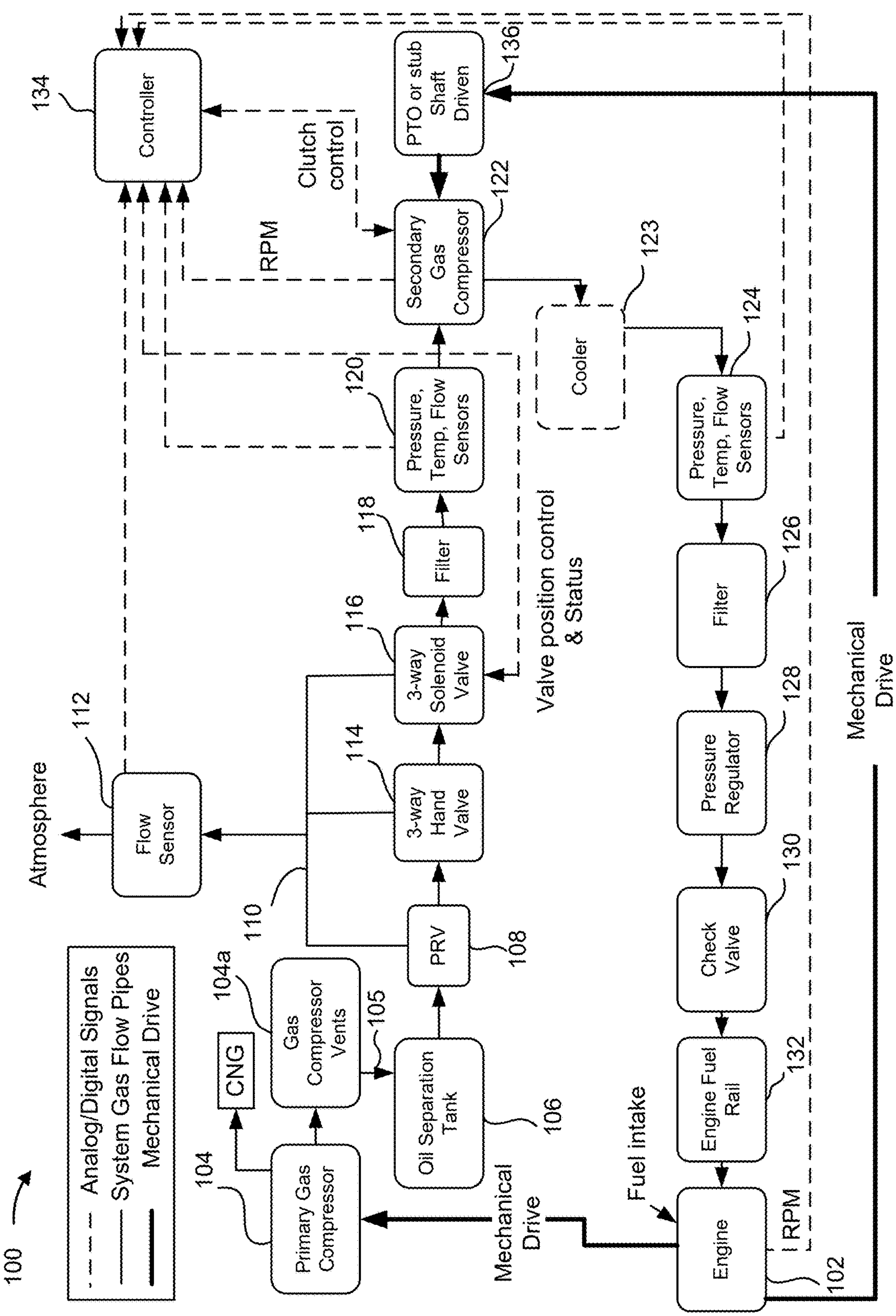
FIG. 1 shows a methane gas mitigation system according to one or more implementations.

This disclosure relates to a methane gas mitigation system which is applicable to any machine, system, or plant that uses a mechanically-driven gas compressor (e.g., a primary gas compressor) to compress field gas into a compressed field gas. For example, the mechanically-driven gas compressor may be driven by an engine that produces mechanical power from a gas fuel source, such as CNG. The mechanically-driven gas compressor may compress a majority portion of the field gas into the compressed field gas, and may vent a minority portion of the field gas as a vented field gas. Instead of allowing the vented field gas to vent into the atmosphere, the methane gas mitigation system may recirculate the vented field gas back to the engine to be used as a portion of the gas fuel source. As a result, an amount of field gas that is vented to the atmosphere is reduced. Moreover, by using the vented field gas, that would have otherwise been released into the atmosphere, as a portion of the gas fuel source of the engine, the methane gas mitigation system is more energy efficient at compressing the field gas.

In some implementations, the methane gas mitigation system may include a secondary gas compressor, the secondary gas compressor arranged on the vented flow path and configured to compress the vented field gas to satisfy a gas pressure operating range of the engine. For example, natural gas engines may require a specific gas pressure (e.g., pounds per square inch (PSI)) or gas pressure range for proper operation. In some examples, the gas pressure operating range of the engine may be 65-75 PSI. Thus, the engine may be configured to operate according to the gas fuel source being within a gas pressure operating range (e.g., a PSI range). As a result, a gas pressure of the vented field gas should be sufficiently high such that, when the vented field gas is used as a portion of the gas fuel source of the engine, the gas fuel source provided to a fuel intake of the engine remains within the gas pressure operating range of the engine. Otherwise, the engine may stall, not start, and/or run inefficiently. The secondary gas compressor may compress the vented field gas such that the gas fuel source satisfies the gas pressure operating range of the engine.

In some implementations, the secondary gas compressor may be mechanically driven by the engine. For example, a power take-off (PTO) may transfer power from the engine to the secondary gas compressor to drive the secondary gas compressor. The PTO may be a mechanical device or system that is connected to the engine (e.g., crankshaft, flywheel, or transmission), and converts rotational energy (torque) into usable power for the secondary gas compressor. In some examples, the engine may drive a stub shaft or a pulley that is connected to the secondary gas compressor. In some implementations, the secondary gas compressor may be driven by another source, such as a utility. In some examples, the utility may be a microgrid.

The methane gas mitigation system and methods may provide as least one of the following benefits, including: achieving optimal performance in terms of methane gas abatement, lowering a cost of compressing the field gas by using the vented field gas as a fuel source for producing mechanical power that drives the mechanically-driven gas compressor, and/or lower a cost of methane gas abatement by using the vented field gas as a fuel source for producing mechanical power that drives the secondary gas compressor.

FIG. 1 shows a methane gas mitigation system 100 according to one or more implementations. The methane gas mitigation system 100 may include an engine 102, a primary gas compressor 104 with gas compressor vents **104*a*, a vented flow path 105, an oil separation tank 106, a pressure relief valve (PRV) 108, an atmospheric (ATM) vent path 110, an ATM flow rate sensor 112 arranged on the atmospheric vent path 110, a three-way hand valve 114, a three-way electrically-controlled valve 116 (e.g., a solenoid valve), an upstream filter 118, upstream sensors 120, a secondary gas compressor 122, a gas cooler 123, downstream sensors 124, a downstream filter 126, a pressure regulator 128, a check valve 130, an engine fuel rail 132, a controller 134, and a mechanical drive system 136. The oil separation tank 106, the pressure relief valve 108, the three-way hand valve 114, the three-way electrically-controlled valve 116, the upstream filter 118, the upstream sensors 120, the secondary gas compressor 122, the gas cooler 123, the downstream sensors 124, the downstream filter 126, the pressure regulator 128, the check valve 130, and the engine fuel rail 132 may be arranged on the vented flow path 105. The vented flow path 105** may include pipes for carrying a vented field gas.

The engine 102 may include a fuel intake that is configured to receive a gas fuel source (e.g., CNG) and produce mechanical power based on the gas fuel source. The engine may be configured to operate according to the gas fuel source being within a gas pressure operating range (e.g., 65-75 PSI) according to a manufacture's specifications. The engine 102 may be configured to drive one or more components of the methane gas mitigation system 100, such as the primary gas compressor 104. In some implementations, the engine 102 may also drive the secondary gas compressor 122. Thus, the engine 102 may convert the gas fuel source into mechanical power that is used to drive the primary gas compressor 104 and the secondary gas compressor 122.

The primary gas compressor 104 is mechanically driven by the engine 102 to compress a field gas into a compressed field gas. The field gas may be a natural gas comprising methane. The compressed field gas, such as CNG, may be collected for storage. The primary gas compressor 104 may compress a majority portion of the field gas into the compressed field gas, and may vent a minority portion of the field gas as a vented field gas. For example, the minority portion of the field gas may be less than 10% in total volume, and preferably less than 5% in total volume. The gas compressor vents 104*a* of the primary gas compressor 104 may provide the vented field gas to the vented flow path 105, which is configured to carry the vented field gas from the primary gas compressor 104 to the engine fuel rail 132.

The oil separation tank 106 is arranged on the vented flow path 105 between the primary gas compressor 104 and the secondary gas compressor 122. In some implementations, the oil separation tank 106 is arranged between the primary gas compressor 104 and the pressure relief valve 108. The oil separation tank 106 may be directly coupled to an outlet of the primary gas compressor 104. The oil separation tank 106 may separate oil contaminants from the vented field gas. For example, the oil contaminants may originate from the primary gas compressor 104, introduced into the vented field gas during compression. Thus, the oil separation tank 106 may remove the oil contaminants from the vented field gas.

The atmospheric vent path 110 configured to release gas, such as the vented field gas, to an atmosphere. For example, the atmospheric vent path 110 may be utilized, during a system error, as a failsafe path for the vented field gas to flow. The ATM flow rate sensor 112 (e.g., a first flow rate sensor) may generate a sensor signal based on a flow rate of the gas within the atmospheric vent path. The ATM flow rate sensor 112 may transmit the sensor signal to the controller 134. The sensor signal may be a first flow rate sensor signal that is based on a flow rate of the vented field gas passed through the atmospheric vent path 110. Thus, the first flow rate sensor signal may be indicative of an amount of vented field gas passed through the atmospheric vent path 110. The flow rate sensor signal may be used to detect one or more system errors, monitor system performance, and/or record the amount of vented field gas passed through the atmospheric vent path 110. The amount of vented field gas passed through the atmospheric vent path 110 may be used to determine whether the methane gas mitigation system 100 is meeting methane mitigation standards.

The pressure relief valve 108 is arranged on the vented flow path 105 between the primary gas compressor 104 and the secondary gas compressor 122. The pressure relief valve 108 may be coupled to the atmospheric vent path 110 and may be configured to redirect the vented field gas to the atmospheric vent path based on a pressure of the vented field gas exceeding a pressure threshold. For example, an error at the primary gas compressor 104 may cause a higher-than-expected amount of field gas to be vented into the vented flow path 105. The higher-than-expected amount of field gas may be too high for downstream components of the vented flow path 105 to handle and/or may raise safety concerns (e.g., caused by high gas pressure in the vented flow path 105). Thus, the pressure relief valve 108 may provide a safety mechanism for automatically releasing a portion of the vented field gas to the atmospheric vent path 110 when the pressure of the vented field gas at the pressure relief valve 108 exceeds the pressure threshold.

The three-way hand valve 114 is arranged on the vented flow path 105 between the primary gas compressor 104 and the secondary gas compressor 122. In some implementations, the three-way hand valve 114 is arranged downstream from the pressure relief valve 108 and upstream from the upstream sensors 120. The three-way hand valve 114 is coupled to the atmospheric vent path 110 and is configured to redirect the vented field gas to the atmospheric vent path 110 based on a manual operation of the three-way hand valve. For example, the three-way hand valve 114 may be configurable in an open state for enabling the vented field gas to flow to the secondary gas compressor 122, and may be configurable in a closed state for redirecting the vented field gas to the atmospheric vent path 110.

The three-way hand valve 114 may include one inlet and two outlets. Opening the three-way hand valve 114 may include opening an outlet of the three-way hand valve 114 to the vented flow path 105, and closing an outlet of the three-way hand valve 114 to the atmospheric vent path 110 such that only one outlet of the three-way hand valve 114 is open. In contrast, closing the three-way hand valve 114 may include closing the outlet of the three-way hand valve 114 to the vented flow path 105, and opening the outlet of the three-way hand valve 114 to the atmospheric vent path 110. Thus, "open" and "closed" refer to whether the vented flow path 105 is open or closed to the secondary gas compressor 122.

The three-way electrically-controlled valve 116 is arranged on the vented flow path 105 between the primary gas compressor 104 and the secondary gas compressor 122. In some implementations, the three-way electrically-controlled valve 116 is arranged downstream from the pressure relief valve 108 and upstream from the upstream sensors 120. The three-way electrically-controlled valve 116 may be arranged in series with the three-way hand valve 114, whereas a position of the three-way hand valve 114 relative to a position of the three-way electrically-controlled valve 116 is interchangeable. The three-way electrically-controlled valve 116 is coupled to the atmospheric vent path 110 and is configured to redirect the vented field gas to the atmospheric vent path 110 based on an electronic control of the three-way electrically-controlled valve 116.

The three-way electrically-controlled valve 116 may include one inlet and two outlets. Opening the three-way electrically-controlled valve 116 may include opening an outlet of the three-way electrically-controlled valve 116 to the vented flow path 105, and closing an outlet of the three-way electrically-controlled valve 116 to the atmospheric vent path 110 such that only one outlet of the three-way electrically-controlled valve 116 is open. In contrast, closing the three-way electrically-controlled valve 116 may include closing the outlet of the three-way electrically-controlled valve 116 to the vented flow path 105, and opening the outlet of the three-way electrically-controlled valve 116 to the atmospheric vent path 110. Thus, "open" and "closed" refer to whether the vented flow path 105 is open or closed to the secondary gas compressor 122. The three-way electrically-controlled valve 116 may be configurable in an open state for enabling the vented field gas to flow to the secondary gas compressor 122, and may be configurable in a closed state for redirecting the vented field gas to the atmospheric vent path 110. The three-way electrically-controlled valve 116 may be controlled by the controller 134. In some implementations, the three-way electrically-controlled valve 116 is a solenoid valve.

The upstream filter 118 is arranged on the vented flow path 105 upstream from the secondary gas compressor 122. The upstream filter 118 may remove liquid contaminants and solid contaminants from the vented field gas. The upstream filter 118 may be a centrifugal filter or a filament filter.

The upstream sensors 120 are arranged on the vented flow path 105 downstream from the pressure relief valve 108, the three-way hand valve 114, and the three-way electrically-controlled valve 116, and upstream from the secondary gas compressor 122. Each upstream sensor is configured to measure a respective property of the vented field gas and generate a sensor signal based on the respective property such that one or more sensor signals are generated. The sensor signals may be provided by the upstream sensors 120 to the controller 134 for monitoring system performance and/or detecting one or more system errors. The upstream sensors 120 may include a pressure sensor, a temperature sensor, and/or a flow rate sensor (e.g., a second flow rate sensor). The pressure sensor may generate a pressure sensor signal based on a pressure of the vented field gas within (e.g. passed through) the vented flow path 105. The temperature sensor may generate a temperature sensor signal based on a temperature of the vented field gas within the vented flow path 105. The flow rate sensor may generate a flow rate sensor signal (e.g., a second flow rate sensor signal) based on a flow rate of the vented field gas within (e.g. passed through) the vented flow path 105.

The controller 134 may receive the pressure sensor signal, the temperature sensor signal, and the flow rate sensor signal, and control the secondary gas compressor 122 and/or the three-way electrically-controlled valve 116 based on the pressure sensor signal, the temperature sensor signal, and the flow rate sensor signal. In some implementations, the controller 134 may control the secondary gas compressor 122 to be on (e.g., in an ON state) based on the three-way hand valve 114 or the three-way electrically-controlled valve 116 being open, and may control the secondary gas compressor 122 to be off (e.g., in an OFF state) based on the three-way hand valve 114 or the three-way electrically-controlled valve 116 being closed.

The secondary gas compressor 122, arranged on the vented flow path 105, may compress the vented field gas to satisfy the gas pressure operating range of the engine 102. The secondary gas compressor 122 may be mechanically driven by the engine 102 to compress the vented field gas. The controller 134 may generate a clutch control signal for engaging or disengaging a clutch of the secondary gas compressor 122. Thus, the controller 134 may operate the secondary gas compressor 122 in an ON state when the clutch is engaged, and may set the secondary gas compressor 122 to an OFF state when the clutch is disengaged.

The secondary gas compressor 122 may be driving by the mechanical drive system 136 that receives power either from the engine 102 or a utility. For example, the mechanical drive system 136 may be a PTO that transfer power from the engine 102 to the secondary gas compressor 122 to drive the secondary gas compressor 122. The PTO may be a mechanical device or system that is connected to the engine 102 (e.g., crankshaft, flywheel, or transmission), and converts rotational energy (torque) into usable power for the secondary gas compressor 122. In some examples, the engine 102 may drive a stub shaft or a pulley that is connected to the secondary gas compressor 122.

The gas cooler 123 is arranged on the vented flow path 105 downstream from the secondary gas compressor 122, between the secondary gas compressor 122 and the pressure regulator 128. The gas cooler 123 may cool the vented field gas. For example, a temperature of the vented field gas may increase as a result of compression in the secondary gas compressor 122. The gas cooler 123 may be used to ensure that the temperature of the vented field gas does not reach a dangerous level at which the vented field gas can self-ignite. The gas cooler 123 may be arranged upstream form the downstream sensors 124.

The downstream sensors 124 are arranged on the vented flow path 105 downstream from the secondary gas compressor 122, and may be arranged upstream from the pressure regulator 128. Each downstream sensor is configured to measure a respective property of the vented field gas and generate a sensor signal based on the respective property such that one or more sensor signals are generated. The sensor signals may be provided by the downstream sensors 124 to the controller 134 for monitoring system performance and/or detecting one or more system errors. The downstream sensors 124 may include a pressure sensor, a temperature sensor, and/or a flow rate sensor. The pressure sensor may generate a pressure sensor signal based on a pressure of the vented field gas within (e.g. passed through) the vented flow path 105. The temperature sensor may generate a temperature sensor signal based on a temperature of the vented field gas within the vented flow path 105. The flow rate sensor may generate a flow rate sensor signal (e.g., a second flow rate sensor signal) based on a flow rate of the vented field gas within (e.g. passed through) the vented flow path 105.

The downstream filter 126 is arranged on the vented flow path downstream from the secondary gas compressor 122, between the secondary gas compressor 122 and the pressure regulator 128. The downstream filter 126 may remove liquid contaminants and solid contaminants from the vented field gas. In some cases, the downstream filter 126 may remove oil contaminants, originating from the secondary gas compressor 122, from the vented field gas. The downstream filter 126 may be a centrifugal filter or a filament filter.

The pressure regulator 128 is arranged on the vented flow path 105 downstream from the secondary gas compressor 122, and preferably downstream from the downstream filter 126. The pressure regulator 128 may regulate the vented field gas to be within the gas pressure operating range at the fuel intake of the engine 102. The pressure regulator 128 may to stabilize a gas pressure of the vented field gas. For example, the gas pressure of the vented field gas that exits the secondary gas compressor 122 may fluctuate. The pressure regulator 128 may provide a more accurate, more consistent regulation of the gas pressure than can be achieved by the secondary gas compressor 122 alone. Thus, the pressure regulator 128 may ensure that the gas fuel source, which includes the vented field gas as a portion of the gas fuel source, satisfies the gas pressure operating range of the engine 102.

The check valve 130 may be arranged between the pressure regulator and the engine fuel rail 132, and may be directly coupled to an inlet of the engine fuel rail 132. The check valve 130 may ensure that there is no backflow from the engine fuel rail 132 entering the vented flow path 105. Thus, the check valve 130 may prevent gas flowing in vented flow path 105 counter to a flow of the vented field gas.

The engine fuel rail 132 may provide the vented field gas, within the gas pressure operating range, from the pressure regulator 128 to the fuel intake of the engine 102, the vented field gas being provided to the fuel intake as a portion of the gas fuel source. The engine fuel rail 132 may be a pipe or other conduit that provides compressed vented field gas (e.g., the vented field gas compressed by the secondary gas compressor 122) to the fuel intake to be mixed with a primary gas fuel source and used for combustion to produce mechanical power.

The controller 134 may monitor and control the operation of the methane gas mitigation system 100. The controller 134 may monitor a performance of the methane gas mitigation system 100 using sensor signals provided by the sensors (e.g., the ATM flow rate sensor 112, the upstream sensors 120, and the downstream sensors 124). The controller 134 may also receive information from the engine 102 and the secondary gas compressor 122, such as revolutions per minute (RPM), and monitor and control the operation of the methane gas mitigation system 100 based on the information. In some implementations, the controller 134 may control the three-way electrically-controlled valve 116 and the secondary gas compressor 122 based on the sensor signals and/or the information received from the engine 102 and the secondary gas compressor 122. The controller 134 may detect system errors or faults, and enter into a failure mode (e.g., a safety mode) based on detecting the system errors or faults. When the methane gas mitigation system 100 is operating normally, without any system error or fault, the controller 134 may operate the methane gas mitigation system 100 in a normal operation mode. The controller 134 may identify a location of a fault, including identifying a faulting component (e.g., the primary gas compressor 104, the three-way electrically-controlled valve 116, or the secondary gas compressor 122). The controller 134 may report a system status, including error codes, to a system operator.

Figure 2:
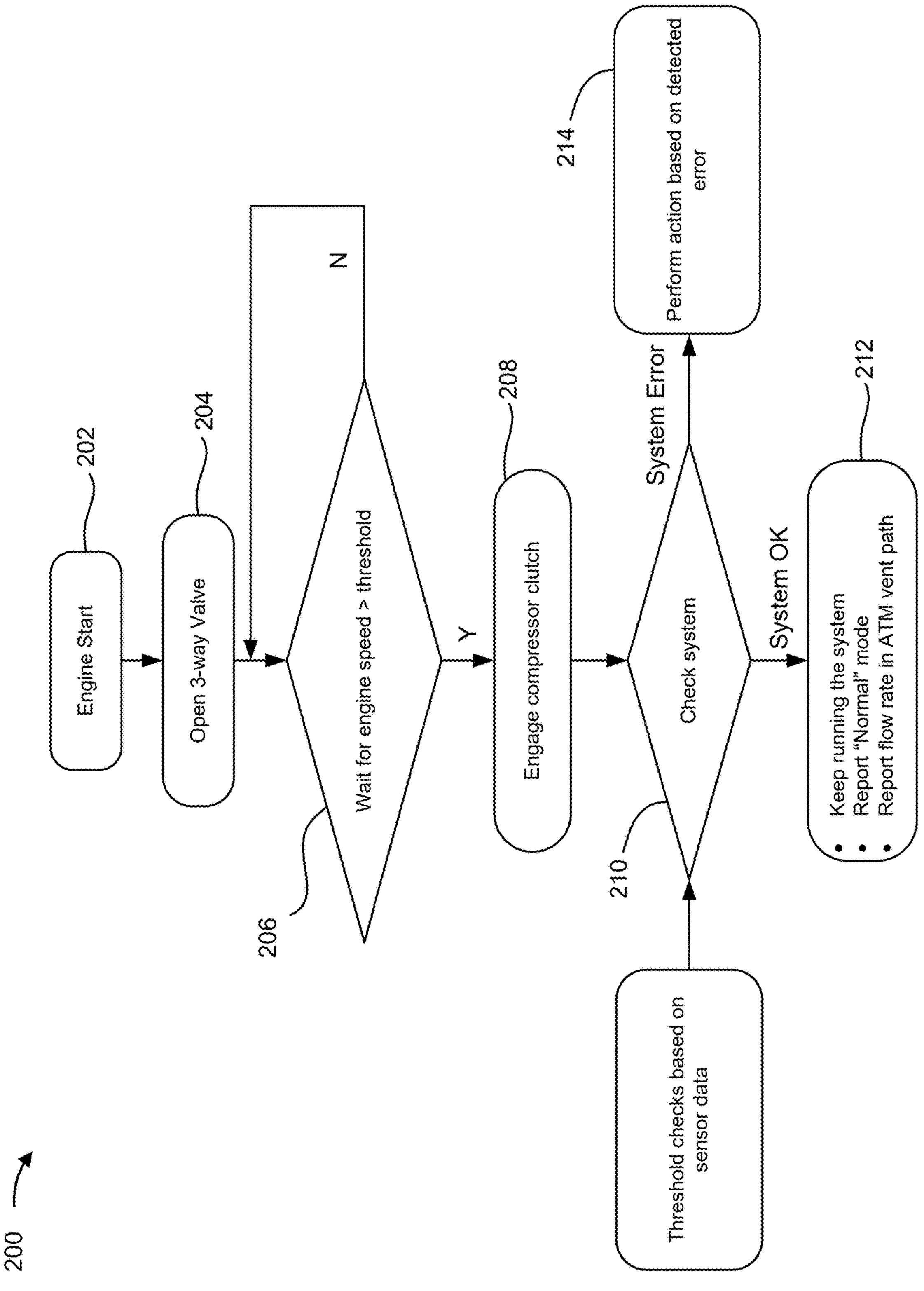
FIG. 2 shows a flow diagram of method of performing a normal operation mode of a methane gas mitigation system.

FIG. 2 shows a flow diagram of method 200 of performing a normal operation mode of a methane gas mitigation system. The methane gas mitigation system may correspond to the methane gas mitigation system 100 described in connection with FIG. 1. The method 200 may be performed, at least in part, by the controller 134. The method 200 may include starting an engine (e.g., engine 102) (block 202). After starting the engine 102, the method 200 may include opening the three-way electrically-controlled valve 116 to enable the vented field gas to flow to the secondary gas compressor 122 (block 204). For example, the controller 134 may open the three-way electrically-controlled valve 116 to enable the vented field gas to flow to the secondary gas compressor 122. The method 200 may include monitoring an RPM of the engine 102 (e.g., engine speed). For example, the controller 134 may detect the start of the engine 102 based on detecting the RPM satisfying a start threshold (e.g., an RPM greater than zero). Thus, based on detecting the start of the engine 102, the controller 134 may open the three-way electrically-controlled valve 116 to enable the vented field gas to flow to the secondary gas compressor 122.

The method 200 may include continuing to monitor the RPM of the engine 102 by comparing the RPM to an RPM threshold, which may be greater than the start threshold (block 206). For example, the controller 134 may continue to monitor the RPM of the engine 102 by comparing the RPM to the RPM threshold.

The method 200 may include, based on the three-way electrically-controlled valve 116 being open and based on the RPM of the engine 102 satisfying an RPM threshold (e.g., being greater than or being equal to or greater than the RPM threshold), engaging a clutch of the secondary gas compressor 122 to start the secondary gas compressor 122 (block 208). For example, based on the three-way electrically-controlled valve 116 being open and based on the RPM of the engine 102 satisfying the RPM threshold, the controller 134 may transmit a control signal to the secondary gas compressor 122 to engage the clutch of the secondary gas compressor 122 to start the secondary gas compressor 122.

The method 200 may include performing system checks (block 210). For example, the controller 134 may perform system checks using threshold checks that are based on sensor data, including data provided in the sensor signals from the sensors (e.g., the ATM flow rate sensor 112, the upstream sensors 120, and the downstream sensors 124) and based on RPM information provided by the engine 102 and the secondary gas compressor 122.

The method 200 may include maintaining the methane gas mitigation system in a normal operation mode based on no faults being detected (block 212), or operating the methane gas mitigation system in a failure mode based on detecting one or more faults (214). For example, the controller 134 may operate the methane gas mitigation system 100 in the normal operation mode or in the failure mode. Operating the methane gas mitigation system in the failure mode based on detecting one or more faults may include closing the three-way electrically-controlled valve 116 in order to redirect the vented field gas to the atmospheric vent path 110, and disengaging the clutch of the secondary gas compressor 122 to turn off the secondary gas compressor 122. The controller 134 may also report an error code, and report a gas flow that is passed through the atmospheric vent path 110 based on sensor date provided by the ATM flow rate sensor 112.

The controller 134 may detect one or more faults based on one or more parameters satisfying a threshold or being outside an acceptable threshold range. The parameters may be provided in sensor signals or in RPM information. For example, one or more faults may be detected based on an upstream gas pressure at the upstream sensors 120 being too high, a downstream gas pressure at the downstream sensors 124 being outside of an acceptable threshold range, the downstream gas pressure at the downstream sensors 124 having too high of an oscillation (e.g., max/min or peak-to-peak value being too high), an upstream gas temperature at the upstream sensors 120 being too high, a downstream gas temperature at the downstream sensors 124 being too high, an upstream flow rate at the upstream sensors 120 being too high, a downstream flow rate at the downstream sensors 124 being too high, an ATM flow rate at the ATM flow rate sensor 112 being too high or too low, depending on a valve position, and/or the RPM of the secondary gas compressor 122 being outside of an acceptable RPM threshold range.

In performing the method 200, the controller 134 may compare a pressure sensor signal, provided by the upstream sensors 120, to a pressure threshold, control the three-way electrically-controlled valve 116 to redirect the vented field gas to the atmospheric vent path 110 based on the pressure sensor signal satisfying the pressure threshold (e.g., for being greater than the pressure threshold), and shut off the secondary gas compressor 122 based on the pressure sensor signal satisfying the pressure threshold (e.g., for being greater than the pressure threshold). Alternatively, the controller 134 may control the three-way electrically-controlled valve 116 to enable the vented field gas to flow to the secondary gas compressor 122 based on the pressure sensor signal not satisfying the pressure threshold, and maintain the secondary gas compressor 122 in an on-state based on the pressure sensor signal not satisfying the pressure threshold.

In performing the method 200, the controller 134 may compare a pressure sensor signal, provided by the downstream sensors 124, to a pressure threshold range, control the three-way electrically-controlled valve 116 to redirect the vented field gas to the atmospheric vent path 110 based on the pressure sensor signal being outside of the pressure threshold range, and shut off the secondary gas compressor 122 based on the pressure sensor signal being outside of the pressure threshold range. In some implementations, the controller 134 may measure a fluctuation of the pressure sensor signal (e.g., peak-to-peak values), compare the fluctuation to a pressure fluctuation threshold, control the three-way electrically-controlled valve 116 to redirect the vented field gas to the atmospheric vent path 110 based on the fluctuation satisfying the pressure fluctuation threshold (e.g., for being greater than the pressure fluctuation threshold), and shut off the secondary gas compressor 122 based on the fluctuation satisfying the pressure fluctuation threshold (e.g., for being greater than the pressure fluctuation threshold).

In performing the method 200, the controller 134 may compare a temperature sensor signal, provided by the upstream sensors 120 or the downstream sensors 124, to a temperature threshold, control the three-way electrically-controlled valve 116 to redirect the vented field gas to the atmospheric vent path 110 based on the temperature sensor signal satisfying the temperature threshold (e.g., for being greater than the temperature threshold), and shut off the secondary gas compressor 122 based on the temperature sensor signal satisfying the temperature threshold (e.g., for being greater than the temperature threshold). Alternatively, the controller 134 may control the three-way electrically-controlled valve 116 to enable the vented field gas to flow to the secondary gas compressor 122 based on the temperature sensor signal not satisfying the temperature threshold, and maintain the secondary gas compressor 122 in an on-state based on the temperature sensor signal not satisfying the temperature threshold.

In performing the method 200, the controller 134 may compare a flow rate sensor signal, provided by the upstream sensors 120 or the downstream sensors 124, to a flow rate threshold, control the three-way electrically-controlled valve 116 to redirect the vented field gas to the atmospheric vent path 110 based on the flow rate sensor signal satisfying the flow rate threshold (e.g., for being greater than the flow rate threshold), and shut off the secondary gas compressor 122 based on the flow rate sensor signal satisfying the flow rate threshold (e.g., for being greater than the flow rate threshold). Alternatively, the controller 134 may control the three-way electrically-controlled valve 116 to enable the vented field gas to flow to the secondary gas compressor 122 based on the flow rate sensor signal not satisfying the flow rate threshold, and maintain the secondary gas compressor 122 in an on-state based on the flow rate sensor signal not satisfying the flow rate threshold.

In performing the method 200, the controller 134 may monitor the RPM of the secondary gas compressor 122, compare the RPM to an RPM threshold range, control the three-way electrically-controlled valve 116 to redirect the vented field gas to the atmospheric vent path 110 based on the RPM being outside of the RPM threshold range, and shut off the secondary gas compressor 122 based on the RPM being outside of the RPM threshold range.

In some implementations, the three-way electrically-controlled valve 116 is configured to provide status information to the controller 134. The status information may indicate whether the three-way electrically-controlled valve 116 is in an open state for enabling the vented field gas to flow to the secondary gas compressor 122 or is in a closed state for redirecting the vented field gas to the atmospheric vent path 110.

In performing the method 200, the controller 134 may, when the status information indicates the open state, compare a first flow rate sensor signal (e.g., a flow rate sensor signal of the ATM flow rate sensor 112) to a first flow rate threshold, and indicate an error based on the first flow rate sensor signal satisfying the first flow rate threshold (e.g., for being greater than the first flow rate threshold). For example, when the three-way electrically-controlled valve 116 is in the open state, very little or no gas should be flowing in the atmospheric vent path 110. The first flow rate sensor signal satisfying the first flow rate threshold may mean that vented field gas is entering the atmospheric vent path 110 via the pressure relief valve 108, which could indicate an error at the primary gas compressor 104 (e.g., the primary gas compressor 104 is venting too much field gas). Alternatively, the first flow rate sensor signal satisfying the first flow rate threshold may mean that vented field gas is entering the atmospheric vent path 110 via the three-way hand valve 114 or the three-way electrically-controlled valve 116, which could indicate a fault at the three-way hand valve 114 or the three-way electrically-controlled valve 116.

When the status information indicates the closed state, the controller 134 may compare the first flow rate sensor signal to a second flow rate threshold, and indicate an error based on the first flow rate sensor signal satisfying the second flow rate threshold (e.g., for being greater than the second flow rate threshold). Since the three-way electrically-controlled valve 116 is in a closed state (e.g. open to the atmospheric vent path 110), the vented field gas is expected to flow through the atmospheric vent path 110. Thus, the second flow rate threshold may be greater than the first flow rate threshold. However, exceeding the second flow rate threshold may indicate an error at the primary gas compressor 104 (e.g., the primary gas compressor 104 is venting too much field gas).

In performing the method 200, the controller 134 may, when the status information indicates the open state, compare a second flow rate sensor signal (e.g., a flow rate sensor signal of the upstream sensors 120 or downstream sensors 124) to a third flow rate threshold, and indicate an error based on the second flow rate sensor signal satisfying the third flow rate threshold (e.g., for being greater than the third flow rate threshold). When the status information indicates the closed state, the controller 134 may compare the second flow rate sensor signal to a fourth flow rate threshold, and indicate an error based on the second flow rate sensor signal satisfying the fourth flow rate threshold (e.g., for being greater than the fourth flow rate threshold). For example, when the three-way electrically-controlled valve 116 is in the closed state, very little or no gas should be flowing in the vented flow path 105, downstream from the three-way electrically-controlled valve 116. Thus, the fourth flow rate threshold may be zero. When the three-way electrically-controlled valve 116 is in the open state, a normal flow of vented field gas should flow downstream from the three-way electrically-controlled valve 116. Thus, the third flow rate threshold is greater than the fourth flow rate threshold. Exceeding the third flow rate threshold may indicate an error at the primary gas compressor 104 (e.g., the primary gas compressor 104 is venting too much field gas).

Figure 3:
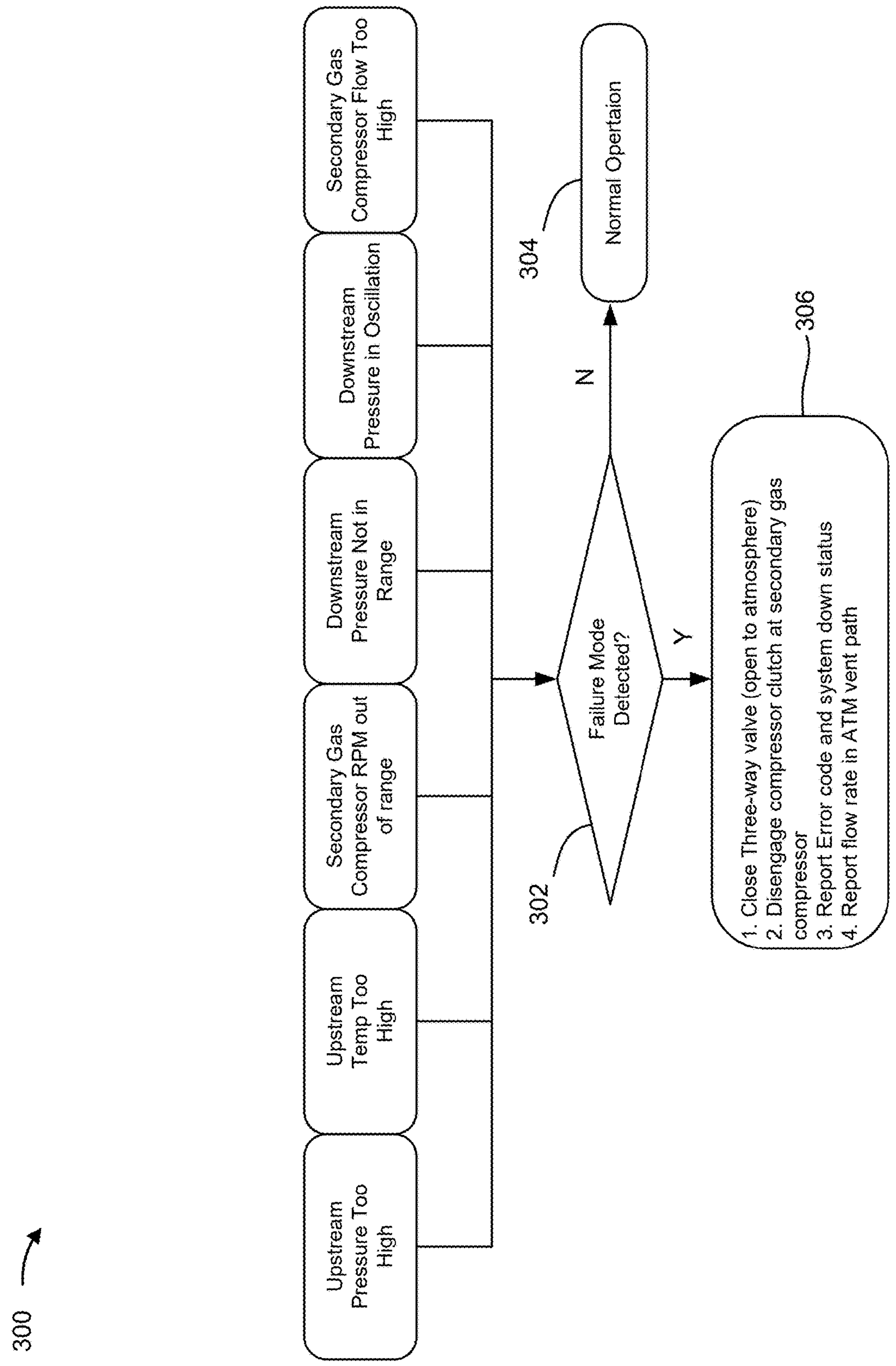
FIG. 3 shows a flow diagram of method of performing a normal operation mode of a methane gas mitigation system.

FIG. 3 shows a flow diagram of method 300 of performing a normal operation mode of a methane gas mitigation system. The methane gas mitigation system may correspond to the methane gas mitigation system 100 described in connection with FIG. 1. The method 300 may be performed, at least in part, by the controller 134. The method 300 may include monitoring for a failure mode (block 302). For example, the controller 134 may monitor for the failure mode based on one or more threshold checks described above. The method 300 may include operating in normal operation mode based on no faults being detected (block 304). The method 300 may include operating in failure mode based on one or more faults being detected (block 306). Operating in failure mode may include closing the three-way electrically-controlled valve 116 (e.g., opening the three-way electrically-controlled valve 116 to the atmospheric vent path 110), disengaging the clutch of the secondary gas compressor 122, reporting an error code for each fault detected, reporting a system down status, and reporting a flow rate or a flow amount in the atmospheric vent path 110.

Figure 4A:
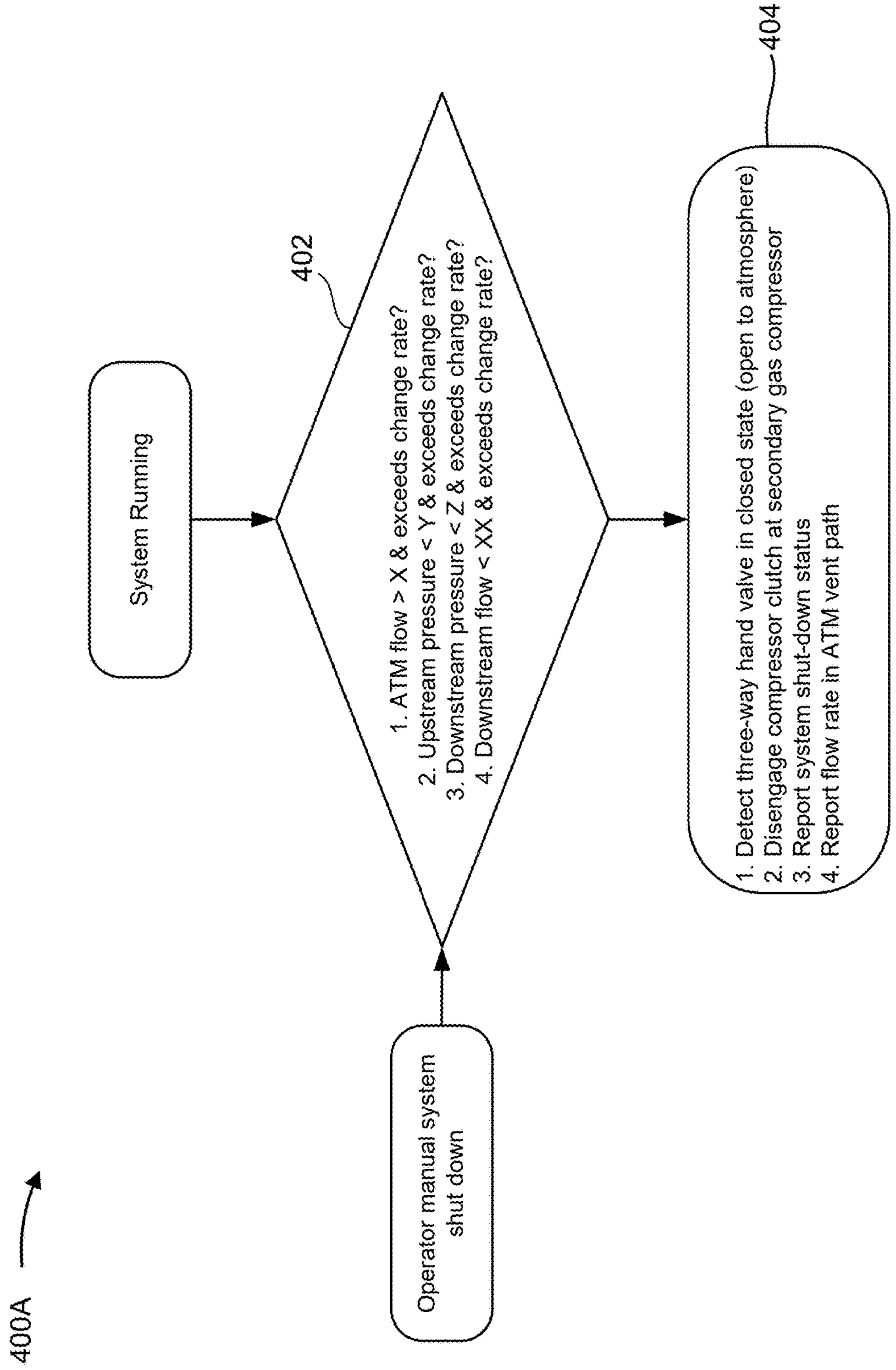
FIG. 4A shows a flow diagram of method of detecting a manual shutdown of a methane gas mitigation system.

FIG. 4A shows a flow diagram of method 400A of detecting a manual shutdown of a methane gas mitigation system. The methane gas mitigation system may correspond to the methane gas mitigation system 100 described in connection with FIG. 1. The manual shutdown may refer to manually closing the three-way hand valve 114 such that the vented field gas flows to the atmospheric vent path 110 instead of to the secondary gas compressor 122. Thus, the method 400A may be used by the controller 134 to detect whether the three-way hand valve 114 has been closed to start a system shutdown.

The method 400A may be performed, at least in part, by the controller 134. The method 400A may include, while the methane gas mitigation system is running (e.g., while the secondary gas compressor 122 is operating to compress vented field gas), performing threshold checks by monitoring an ATM flow in the atmospheric vent path 110, an upstream gas pressure at the upstream sensors 120, a downstream gas pressure at the downstream sensors 124, and a gas flow in the vented flow path 105 at the upstream sensors 120 or the downstream sensors 124 (block 402). The method 400 may further include, based on detecting that the three-way hand valve 114 has been closed, performing a system shutdown (block 404).

Closing or opening the three-way hand valve 114 may cause a rapid change (or transient) in pressure and flow rate in the vented flow path 105 and the atmospheric vent path 110. For example, closing the three-way hand valve 114 should cause a rapid increase in pressure and gas flow in the atmospheric vent path 110 and a rapid decrease in pressure and gas flow in the vented flow path 105. Alternatively, opening the three-way hand valve 114 should cause a rapid increase in pressure and gas flow in the vented flow path 105 and a rapid decrease in pressure and gas flow in the atmospheric vent path 110.

The pressure sensor of the upstream sensors 120 may be referred to as a first pressure sensor that generates a first pressure sensor signal. The pressure sensor of the downstream sensors 124 may be referred to as a second pressure sensor that generates a second pressure sensor signal. The first pressure sensor may generate the first pressure sensor signal based on a first pressure of the vented field gas within the vented flow path 105. The second pressure sensor may generate the second pressure sensor signal based on a second pressure of the vented field gas within the vented flow path 105.

In performing the method 400A, the controller 134 may compare the first pressure sensor signal to a first pressure threshold, and compare a rate-of-change of the first pressure sensor signal to a first rate-of-change threshold. Based on the first pressure sensor signal being less than the first pressure threshold, and based on the rate-of-change of the first pressure sensor signal being greater than the first rate-of-change threshold, the controller 134 may detect that the three-way hand valve 114 is in the closed state (e.g., the three-way hand valve 114 has just been manually closed) and turn off the secondary gas compressor 122. Additionally, or alternatively, the controller 134 may compare the second pressure sensor signal to a second pressure threshold, and compare a rate-of-change of the second pressure sensor signal to a second rate-of-change threshold. Based on the second pressure sensor signal being less than the second pressure threshold, and based on the rate-of-change of the second pressure sensor signal being greater than the second rate-of-change threshold, the controller 134 may detect that the three-way hand valve 114 is in the closed state and turn off the secondary gas compressor In performing the method 400A, the controller 134 may compare a flow rate sensor signal, provided by the upstream sensors 120 or the downstream sensors 124, to a flow rate threshold, and compare a rate-of-change of the flow rate sensor signal to a rate-of-change threshold. Based on the flow rate sensor signal being less than the flow rate threshold, and based on the rate-of-change of the flow rate sensor signal being greater than the rate-of-change threshold, the controller 134 may detect that the three-way hand valve 114 is in the closed state and turn off the secondary gas compressor 122.

In performing the method 400A, the controller 134 may compare a flow rate sensor signal, provided by the ATM flow rate sensor 112, to a flow rate threshold, and compare a rate-of-change of the flow rate sensor signal to a rate-of-change threshold. Based on the flow rate sensor signal being greater than the flow rate threshold, and based on the rate-of-change of the flow rate sensor signal being greater than the rate-of-change threshold, the controller 134 may detect that the three-way hand valve 114 is in the closed state and turn off the secondary gas compressor 122.

Performing the system shutdown (block 404) may include disengaging the clutch of the secondary gas compressor 122 to turn off the secondary gas compressor 122, report a system down status, and report a flow rate or a flow amount in the atmospheric vent path 110.

Figure 4B:
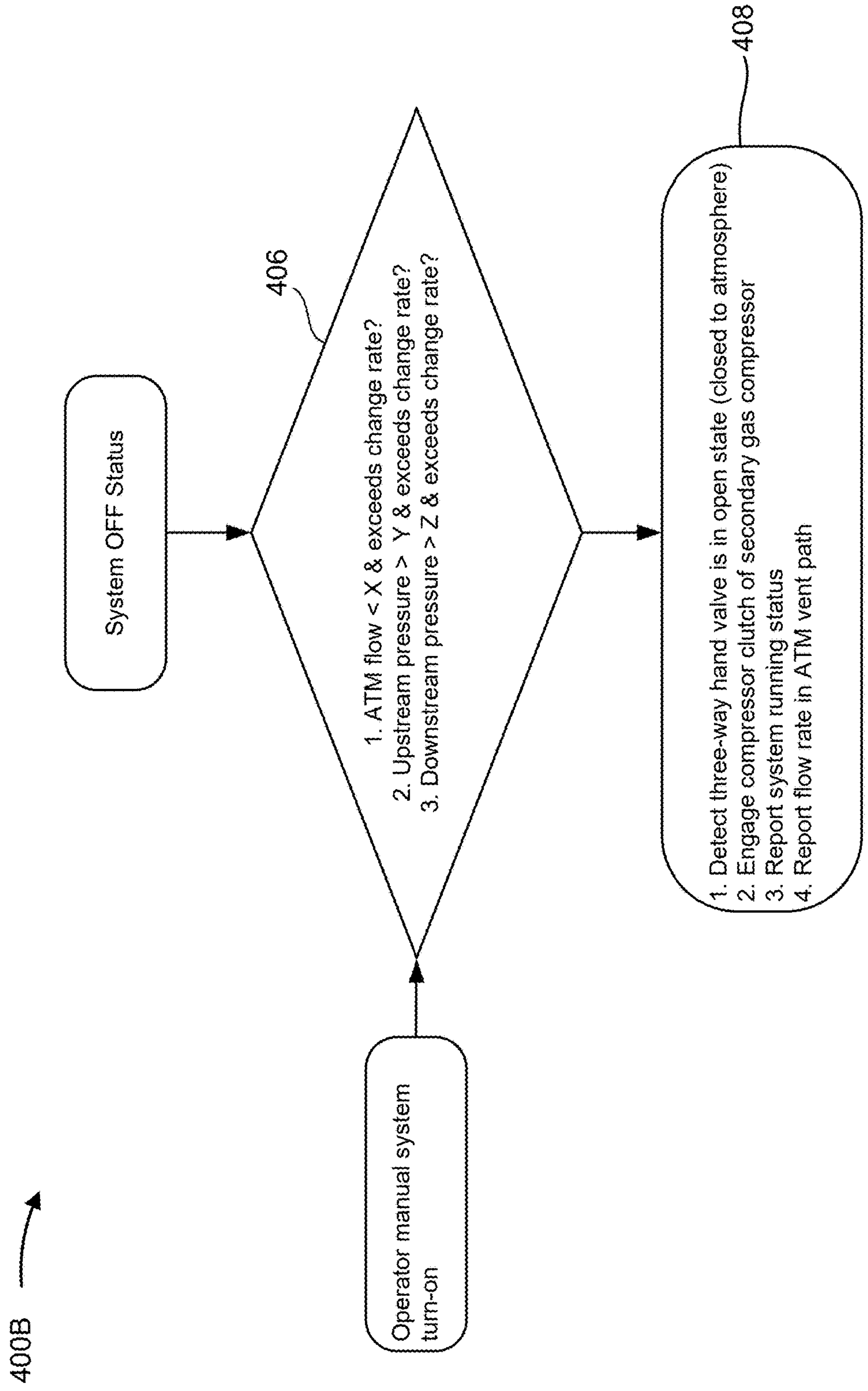
FIG. 4B shows a flow diagram of method of detecting a manual turn-on of a methane gas mitigation system.

FIG. 4B shows a flow diagram of method 400B of detecting a manual turn-on of a methane gas mitigation system. The methane gas mitigation system may correspond to the methane gas mitigation system 100 described in connection with FIG. 1. The manual turn-on may refer to manually opening the three-way hand valve 114 such that the vented field gas flows to the secondary gas compressor 122 instead of to the atmospheric vent path 110. Thus, the method 400B may be used by the controller 134 to detect whether the three-way hand valve 114 has been opened to start a system turn-on.

The method 400B may be performed, at least in part, by the controller 134. The method 400B may include, while the methane gas mitigation system is off (e.g., while the secondary gas compressor 122 is off), performing threshold checks by monitoring an ATM flow in the atmospheric vent path 110, an upstream gas pressure at the upstream sensors 120, and a gas flow in the vented flow path 105 at the upstream sensors 120 or the downstream sensors 124 (block 406). The method 400 may further include, based on detecting that the three-way hand valve 114 has been opened, performing a system turn-on (block 408).

Opening the three-way hand valve 114 should cause a rapid increase in pressure and gas flow in the vented flow path 105 and a rapid decrease in pressure and gas flow in the atmospheric vent path 110. In performing the method 400B, the controller 134 may, based on the first pressure sensor signal being greater than the first pressure threshold, and based on the rate-of-change of the first pressure sensor signal being greater than the first rate-of-change threshold, detect that the three-way hand valve 114 is in the open state (e.g., the three-way hand valve 114 has just been manually opened) and turn on the secondary gas compressor 122. Additionally, or alternatively, the controller 134 may, based on the flow rate sensor signal being greater than the flow rate threshold, and based on the rate-of-change of the flow rate sensor signal being greater than the rate-of-change threshold, detect that the three-way hand valve 114 is in the open state and turn on the secondary gas compressor 122. Additionally, or alternatively, the controller 134 may, based on the flow rate sensor signal being less than the flow rate threshold, and based on the rate-of-change of the flow rate sensor signal being greater than the rate-of-change threshold, detect that the three-way hand valve 114 is in the open state and turn on the secondary gas compressor 122.

Performing the system turn-on (block 408) may include engaging the clutch of the secondary gas compressor 122 to turn on the secondary gas compressor 122, report a system running status, and report a flow rate or a flow amount in the atmospheric vent path 110.

INDUSTRIAL APPLICABILITY

The described implementations reduce greenhouse gas emissions into the atmosphere. The described implementations provide an efficient methane gas mitigation system that recirculates vented field gas, such as natural gas, for use as a portion of a gas fuel source of an engine. The engine uses the vented field gas to drive a primary gas compressor that compresses field gas and vents a portion of the field gas as the vented field gas. Thus, an efficient loop is provided that both abates methane gas emissions and increases a power efficiency of the system by using the vented field gas as a fuel source for the engine.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

Some implementations may be described herein in connection with thresholds. As used herein, "satisfying" a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "upstream", "downstream," "below," "lower," "above," "upper," and the like, may be used herein for ease of description to describe one element or feature's relationship to another element(s) or feature(s) as illustrated in the figures.

What is claimed is:

1. A methane gas mitigation system, comprising:

an engine comprising a fuel intake configured to receive a gas fuel source and produce mechanical power based on the gas fuel source, wherein the engine is configured to operate according to the gas fuel source being within a gas pressure operating range;

a primary gas compressor mechanically driven by the engine, wherein the primary gas compressor is configured to compress a majority portion of field gas into compressed field gas, and wherein the primary gas compressor is configured to vent a minority portion of the field gas as a vented field gas;

a vented flow path configured to carry the vented field gas from the primary gas compressor;

a secondary gas compressor arranged on the vented flow path and configured to compress the vented field gas to satisfy the gas pressure operating range;

an atmospheric vent path configured to release gas to an atmosphere;

a three-way electrically-controlled valve arranged on the vented flow path between the primary gas compressor and the secondary gas compressor, the three-way electrically-controlled valve being coupled to the atmospheric vent path and configured to, based on an electronic control of the three-way electrically-controlled valve, enable the vented field gas to flow to the secondary gas compressor or redirect the vented field gas to the atmospheric vent path;

an engine fuel rail coupled to an output of the secondary gas compressor and configured to provide the vented field gas, within the gas pressure operating range, to the fuel intake of the engine, the vented field gas being provided to the fuel intake as a portion of the gas fuel source;

one or more sensors arranged on the vented flow path downstream from the three-way electrically-controlled valve, each sensor of the one or more sensors configured to measure a respective property of the vented field gas and generate a sensor signal based on the respective property such that one or more sensor signals are generated; and a controller configured to receive the one or more sensor signals, and control the secondary gas compressor and the three-way electrically-controlled valve based on the one or more sensor signals.

2. The methane gas mitigation system of claim 1, wherein the controller is configured to:

monitor a revolutions per minute (RPM) of the engine, detect a start of the engine based on the RPM, based on detecting the start of the engine, open the three-way electrically-controlled valve to enable the vented field gas to flow to the secondary gas compressor, and based on the three-way electrically-controlled valve being open and based on the RPM satisfying an RPM threshold, engage a clutch of the secondary gas compressor to start the secondary gas compressor.

3. The methane gas mitigation system of claim 1, wherein the one or more sensors include a pressure sensor arranged on the vented flow path upstream from the secondary gas compressor, the pressure sensor configured to generate a pressure sensor signal based on a pressure of the vented field gas within the vented flow path, and wherein the controller is configured to compare the pressure sensor signal to a pressure threshold, control the three-way electrically-controlled valve to redirect the vented field gas to the atmospheric vent path based on the pressure sensor signal satisfying the pressure threshold, and shut off the secondary gas compressor based on the pressure sensor signal satisfying the pressure threshold.

4. The methane gas mitigation system of claim 3, wherein the controller is configured to control the three-way electrically-controlled valve to enable the vented field gas to flow to the secondary gas compressor based on the pressure sensor signal not satisfying the pressure threshold, and maintain the secondary gas compressor in an on-state based on the pressure sensor signal not satisfying the pressure threshold.

5. The methane gas mitigation system of claim 1, wherein the one or more sensors include a pressure sensor arranged on the vented flow path downstream from the secondary gas compressor, the pressure sensor configured to generate a pressure sensor signal based on a pressure of the vented field gas within the vented flow path, and wherein the controller is configured to compare the pressure sensor signal to a pressure threshold range, control the three-way electrically-controlled valve to redirect the vented field gas to the atmospheric vent path based on the pressure sensor signal being outside of the pressure threshold range, and shut off the secondary gas compressor based on the pressure sensor signal being outside of the pressure threshold range.

6. The methane gas mitigation system of claim 5, wherein the controller is configured to measure a fluctuation of the pressure sensor signal, compare the fluctuation to a pressure fluctuation threshold, control the three-way electrically-controlled valve to redirect the vented field gas to the atmospheric vent path based on the fluctuation satisfying the pressure fluctuation threshold, and shut off the secondary gas compressor based on the fluctuation satisfying the pressure fluctuation threshold.

7. The methane gas mitigation system of claim 1, wherein the one or more sensors include a temperature sensor arranged on the vented flow path upstream from the secondary gas compressor or downstream from the secondary gas compressor, the temperature sensor configured to generate a temperature sensor signal based on a temperature of the vented field gas within the vented flow path, and wherein the controller is configured to compare the temperature sensor signal to a temperature threshold, control the three-way electrically-controlled valve to redirect the vented field gas to the atmospheric vent path based on the temperature sensor signal satisfying the temperature threshold, and shut off the secondary gas compressor based on the temperature sensor signal satisfying the temperature threshold.

8. The methane gas mitigation system of claim 7, wherein the controller is configured to control the three-way electrically-controlled valve to enable the vented field gas to flow to the secondary gas compressor based on the temperature sensor signal not satisfying the temperature threshold, and maintain the secondary gas compressor in an on-state based on the temperature sensor signal not satisfying the temperature threshold.

9. The methane gas mitigation system of claim 1, wherein the one or more sensors include a flow rate sensor arranged on the vented flow path upstream from the secondary gas compressor or downstream from the secondary gas compressor, the flow rate sensor configured to generate a flow rate sensor signal based on a flow rate of the vented field gas passed through the vented flow path, and wherein the controller is configured to compare the flow rate sensor signal to a flow rate threshold, control the three-way electrically-controlled valve to redirect the vented field gas to the atmospheric vent path based on the flow rate sensor signal satisfying the flow rate threshold, and shut off the secondary gas compressor based on the flow rate sensor signal satisfying the flow rate threshold.

10. The methane gas mitigation system of claim 9, wherein the controller is configured to control the three-way electrically-controlled valve to enable the vented field gas to flow to the secondary gas compressor based on the flow rate sensor signal not satisfying the flow rate threshold, and maintain the secondary gas compressor in an on-state based on the flow rate sensor signal not satisfying the flow rate threshold.

11. The methane gas mitigation system of claim 1, wherein the controller is configured to:

monitor a revolutions per minute (RPM) of the secondary gas compressor, compare the RPM to an RPM threshold range, control the three-way electrically-controlled valve to redirect the vented field gas to the atmospheric vent path based on the RPM being outside of the RPM threshold range, and shut off the secondary gas compressor based on the RPM being outside of the RPM threshold range.

12. The methane gas mitigation system of claim 1, further comprising:

a first flow rate sensor arranged on the atmospheric vent path, the first flow rate sensor configured to generate a first flow rate sensor signal based on a flow rate of the vented field gas passed through the atmospheric vent path, the first flow rate sensor signal being indicative of an amount of vented field gas passed through the atmospheric vent path.

13. The methane gas mitigation system of claim 12, wherein the three-way electrically-controlled valve is configured to provide status information to the controller, the status information indicating whether the three-way electrically-controlled valve is in an open state for enabling the vented field gas to flow to the secondary gas compressor or is in a closed state for redirecting the vented field gas to the atmospheric vent path, wherein, when the status information indicates the open state, the controller is configured to compare the first flow rate sensor signal to a first flow rate threshold, and indicate an error based on the first flow rate sensor signal satisfying the first flow rate threshold, wherein, when the status information indicates the closed state, the controller is configured to compare the first flow rate sensor signal to a second flow rate threshold, and indicate an error based on the first flow rate sensor signal satisfying the second flow rate threshold, and wherein the second flow rate threshold is greater than the first flow rate threshold.

14. The methane gas mitigation system of claim 13, further comprising:

a pressure relief valve arranged on the vented flow path between the primary gas compressor and the three-way electrically-controlled valve, the pressure relief valve being coupled to the atmospheric vent path and configured to redirect the vented field gas to the atmospheric vent path based on a pressure of the vented field gas exceeding a pressure threshold.

15. The methane gas mitigation system of claim 13, wherein the one or more sensors include a second flow rate sensor arranged on the vented flow path upstream from the secondary gas compressor or downstream from the secondary gas compressor, the second flow rate sensor configured to generate a second flow rate sensor signal based on a flow rate of the vented field gas passed through the vented flow path, wherein, when the status information indicates the open state, the controller is configured to compare the second flow rate sensor signal to a third flow rate threshold, and indicate an error based on the second flow rate sensor signal satisfying the third flow rate threshold, wherein, when the status information indicates the closed state, the controller is configured to compare the second flow rate sensor signal to a fourth flow rate threshold, and indicate an error based on the second flow rate sensor signal satisfying the fourth flow rate threshold, and wherein the third flow rate threshold is greater than the fourth flow rate threshold.

16. A methane gas mitigation system, comprising:

an engine comprising a fuel intake configured to receive a gas fuel source and produce mechanical power based on the gas fuel source, wherein the engine is configured to operate according to the gas fuel source being within a gas pressure operating range;

a primary gas compressor mechanically driven by the engine, wherein the primary gas compressor is configured to compress a majority portion of field gas into compressed field gas, and wherein the primary gas compressor is configured to vent a minority portion of the field gas as a vented field gas;

a vented flow path configured to carry the vented field gas from the primary gas compressor;

a secondary gas compressor arranged on the vented flow path and configured to compress the vented field gas to satisfy the gas pressure operating range;

an atmospheric vent path configured to release gas to an atmosphere;

a three-way hand valve arranged on the vented flow path between the primary gas compressor and the secondary gas compressor, the three-way hand valve being coupled to the atmospheric vent path, wherein the three-way hand valve is configurable in an open state for enabling the vented field gas to flow to the secondary gas compressor, and is configurable in a closed state for redirecting the vented field gas to the atmospheric vent path;

an engine fuel rail coupled to an output of the secondary gas compressor and configured to provide the vented field gas, within the gas pressure operating range, to the fuel intake of the engine, the vented field gas being provided to the fuel intake as a portion of the gas fuel source;

one or more sensors arranged on the vented flow path downstream from the three-way hand valve, each sensor of the one or more sensors configured to measure a respective property of the vented field gas and generate a sensor signal based on the respective property such that one or more sensor signals are generated; and a controller configured to receive one or more sensor signals and control the secondary gas compressor based on the one or more sensor signals.

17. The methane gas mitigation system of claim 16, wherein the one or more sensors include a first pressure sensor arranged on the vented flow path upstream from the secondary gas compressor, the first pressure sensor configured to generate a first pressure sensor signal based on a first pressure of the vented field gas within the vented flow path, wherein the one or more sensors include a second pressure sensor arranged on the vented flow path downstream from the secondary gas compressor, the second pressure sensor configured to generate a second pressure sensor signal based on a second pressure of the vented field gas within the vented flow path, and wherein the controller is configured to:

compare the first pressure sensor signal to a first pressure threshold, compare a rate-of-change of the first pressure sensor signal to a first rate-of-change threshold, based on the first pressure sensor signal being less than the first pressure threshold, and based on the rate-of-change of the first pressure sensor signal being greater than the first rate-of-change threshold, detect that the three-way hand valve is in the closed state and turn off the secondary gas compressor, compare the second pressure sensor signal to a second pressure threshold, compare a rate-of-change of the second pressure sensor signal to a second rate-of-change threshold, based on the second pressure sensor signal being less than the second pressure threshold, and based on the rate-of-change of the second pressure sensor signal being greater than the second rate-of-change threshold, detect that the three-way hand valve is in the closed state and turn off the secondary gas compressor, and based on the first pressure sensor signal being greater than the first pressure threshold, and based on the rate-of-change of the first pressure sensor signal being greater than the first rate-of-change threshold, detect that the three-way hand valve is in the open state and turn on the secondary gas compressor.

18. The methane gas mitigation system of claim 16, wherein the one or more sensors include a flow rate sensor arranged on the vented flow path upstream from the secondary gas compressor or downstream from the secondary gas compressor, the flow rate sensor configured to generate a flow rate sensor signal based on a flow rate of the vented field gas passed through the vented flow path, and wherein the controller is configured to:

compare the flow rate sensor signal to a flow rate threshold, compare a rate-of-change of the flow rate sensor signal to a rate-of-change threshold, based on the flow rate sensor signal being less than the flow rate threshold, and based on the rate-of-change of the flow rate sensor signal being greater than the rate-of-change threshold, detect that the three-way hand valve is in the closed state and turn off the secondary gas compressor, and based on the flow rate sensor signal being greater than the flow rate threshold, and based on the rate-of-change of the flow rate sensor signal being greater than the rate-of-change threshold, detect that the three-way hand valve is in the open state and turn on the secondary gas compressor.

19. The methane gas mitigation system of claim 16, further comprising:

a flow rate sensor arranged on the atmospheric vent path, the flow rate sensor configured to generate a flow rate sensor signal based on a flow rate of the vented field gas passed through the atmospheric vent path, and wherein the controller is configured to:

compare the flow rate sensor signal to a flow rate threshold, compare a rate-of-change of the flow rate sensor signal to a rate-of-change threshold, based on the flow rate sensor signal being greater than the flow rate threshold, and based on the rate-of-change of the flow rate sensor signal being greater than the rate-of-change threshold, detect that the three-way hand valve is in the closed state and turn off the secondary gas compressor, and based on the flow rate sensor signal being less than the flow rate threshold, and based on the rate-of-change of the flow rate sensor signal being greater than the rate-of-change threshold, detect that the three-way hand valve is in the open state and turn on the secondary gas compressor.

20. A method of mitigating methane from being released into an atmosphere, the method comprising:

providing a gas fuel source to a fuel intake of an engine, the gas fuel source being provided within a gas pressure operating range of the engine;

producing, by the engine, mechanical power based on fuel source;

using the mechanical power to drive a primary gas compressor, the primary gas compressor being configured to compress a majority portion of field gas into compressed field gas, and vent a minority portion of the field gas as a vented field gas to a vented flow path;

compressing, by a secondary gas compressor arranged on the vented flow path, the vented field gas to satisfy the gas pressure operating range;

providing, by an engine fuel rail coupled to an output of the secondary gas compressor, the vented field gas to the fuel intake of the engine, the vented field gas being provided to the fuel intake as a portion of the gas fuel source;

sensing, by a sensor arranged on the vented flow path, a property of the vented field gas to generate a sensor signal that is representative of the property;

controlling, by a controller, a three-way electrically-controlled valve based on the sensor signal, the three-way electrically-controlled valve being arranged on the vented flow path between the primary gas compressor and the secondary gas compressor, the three-way electrically-controlled valve being coupled to an atmospheric vent path, and the three-way electrically-controlled valve being configurable in an open state for enabling the vented field gas to flow to the secondary gas compressor, and is configurable in a closed state for redirecting the vented field gas to the atmospheric vent path; and controlling, by the controller, the secondary gas compressor based on the sensor signal.

* * * * *